United States Patent
Balid et al.

(10) Patent No.: US 12,467,958 B2
(45) Date of Patent: Nov. 11, 2025

(54) CONNECTIVITY VERIFICATION FOR AN ABSENCE OF VOLTAGE TESTER SYSTEM

(71) Applicant: Panduit Corp., Tinley Park, IL (US)

(72) Inventors: Walid Balid, Orland Park, IL (US); Masud Bolouri-Saransar, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 359 days.

(21) Appl. No.: 17/381,388

(22) Filed: Jul. 21, 2021

(65) Prior Publication Data

US 2022/0236306 A1 Jul. 28, 2022

Related U.S. Application Data

(60) Provisional application No. 63/141,569, filed on Jan. 26, 2021.

(51) Int. Cl.
*G01R 19/155* (2006.01)
*G01R 31/327* (2006.01)

(52) U.S. Cl.
CPC ....... *G01R 19/155* (2013.01); *G01R 31/3275* (2013.01)

(58) Field of Classification Search
None
See application file for complete search history.

(56) References Cited

U.S. PATENT DOCUMENTS

| | | |
|---|---|---|
| 4,335,348 A | 6/1982 | Reed et al. |
| 9,921,260 B2 | 3/2018 | Bugaris et al. |
| 2004/0178801 A1* | 9/2004 | Hart, Jr. ............... H04N 17/00 324/637 |
| 2004/0181348 A1* | 9/2004 | Hird ...................... G01R 31/58 702/44 |
| 2014/0256269 A1 | 9/2014 | Kamakaris |
| 2017/0244442 A1* | 8/2017 | Mizokami ............. H03F 1/565 |
| 2017/0269128 A1* | 9/2017 | Bugaris ................ G01R 19/155 |

FOREIGN PATENT DOCUMENTS

| | | |
|---|---|---|
| EP | 3734311 A1 | 11/2020 |
| WO | 2016048954 A1 | 3/2016 |

OTHER PUBLICATIONS

Tokuda Masamitsu; Transmitter Apparatus and Receiver Apparatus; Date Published Mar. 11, 2004; JP 2004080441 A; CPC: H04B 3/54 (Year: 2004).*

* cited by examiner

*Primary Examiner* — Nasima Monsur
(74) *Attorney, Agent, or Firm* — Christopher K. Marlow; Christopher S. Clancy; James H. Williams

(57) ABSTRACT

A permanently installed absence of voltage tester (AVT) may include a connectivity verification system for verifying the connectivity of system cable leads to the main power lines in electrical equipment. An installed AVT may indicate whether the electrical equipment is in an electrically safe state without first requiring direct access to the equipment. One step in the AVT test procedure may include connectivity verification by the connectivity verification system, which may include a sub-procedure to confirm that the installed AVT is directly coupled as intended with direct connection to the equipment being monitored. The connectivity verification system may validate that the AVT is measuring the actual voltage on the power lines of the electrical equipment and has not registered a no-voltage condition due to an unknown disconnection error or installation failure.

11 Claims, 7 Drawing Sheets

| Phase | Seq | DEMUX/Cnt IN1 | DEMUX/Cnt IN2 | RF GEN on/off | RF Generation Line L1-RF | RF Generation Line L2-RF | RF Generation Line L3-RF | Correct OUT | Comment |
|---|---|---|---|---|---|---|---|---|---|
| - | 1 | 0 | 0 | OFF | - | - | - | 0 | Circuit Self-Test |
| - | 2 | 0 | 0 | ON | - | - | - | 1 | Circuit Baseline |
| L1 | 3 | 1 | 0 | OFF | x | - | - | 0 | L1 Baseline |
| L1 | 4 | 1 | 0 | ON | x | - | - | 1 | L1 Test |
| L2 | 5 | 0 | 1 | OFF | - | x | - | 0 | L2 Baseline |
| L2 | 6 | 0 | 1 | ON | - | x | - | 1 | L2 Test |
| L3 | 7 | 1 | 1 | OFF | - | - | x | 0 | L3 Baseline |
| L3 | 8 | 1 | 1 | ON | - | - | x | 1 | L3 Test |

CONNECTIVITY VERIFICATION FOR AN ABSENCE OF VOLTAGE TESTER SYSTEM

CROSS REFERENCE TO RELATED APPLICATION(S)

This application claims benefit to U.S. Provisional Patent Application No. 63/141,569, filed on Jan. 26, 2021, the entirety of which is hereby incorporated by reference herein.

TECHNICAL FIELD

The present disclosure is directed to a connectivity verification system and, more particularly, to a connectivity verification system for an absence of voltage tester.

BACKGROUND

When servicing electrical equipment, workers should comply with safety regulations that require a voltage verification test to validate the absence of voltage. This process requires strict adherence to prevent accidents and bodily injury but includes many stages that can be complex and time-consuming when using hand-held portable test instruments. Moreover, implementing a voltage verification test with a hand-held tester exposes an individual performing the test to potential electrical hazards if the equipment being serviced is not properly de-energized. A permanently installed absence of voltage tester may automate this process without exposing individuals to harmful voltages and currents.

SUMMARY

Various aspects of the present disclosure relate to verifying connectivity of an absence of voltage tester to power (or ground) lines in electrical equipment. In one or more illustrative embodiments, a method for verifying connectivity of an absence of voltage tester to power lines in electrical equipment is provided. The method may include generating a radio frequency (RF) signal at a predetermined frequency using an RF signal generator and transmitting the RF signal across a circuit including a pair of wire leads. Each wire in the pair of wire leads may be connected to a power line having the same phase. The method may further include receiving the RF signal at an RF detector; sensing an output of the RF detector; and determining whether each wire in the pair of wire leads is connected to the same power line based on an amplitude of the output.

Implementations may include one or more of the following features. For instance, a change in amplitude of the output of the RF detector may be indicative of a change in characteristic impedance of the circuit. The step of determining whether each wire in the pair of wire leads is connected to the same power line based on an amplitude of the output may include: comparing the amplitude to a threshold; and verifying that each wire in the pair of wire leads is connected to the same power line when the amplitude is below the threshold. Alternatively, the step of determining whether each wire in the pair of wire leads is connected to the same power line based on an amplitude of the output may include: comparing the amplitude to a threshold; and verifying that each wire in the pair of wire leads is connected to the same power line when the amplitude exceeds the threshold.

The method may further include, prior to transmitting the RF signal across the circuit, connecting the RF signal generator to the circuit using an analog switch. Moreover, prior to connecting the RF signal generator to the circuit, the method may include analyzing the output of the RF detector with the RF signal generator off and/or analyzing the output of the RF detector with the RF signal generator on.

One or more additional embodiments of the present disclosure are directed to a connectivity verification system. The connectivity verification system may include a radio frequency (RF) signal generator configured to generate an RF signal, an RF detector in communication with the RF signal generator, and a circuit having a characteristic impedance. The circuit may be coupled to the RF signal generator and RF detector and include a pair of wire leads. Each wire in the pair of wire leads may be connected to the same phase wire of a power line. The connectivity of the pair of wire leads to the same phase wire of the power line may be verified by analyzing an output level of the RF detector.

Implementations may include one or more of the following features. The circuit may include at least one LC Balun for converting the RF signal from single-ended to differential. Each output of the LC Balun may be connected to one wire in the pair of wire leads through an LC resonance filter. Alternatively, the circuit may comprise a signal transformer including a primary side and a secondary side having at least two secondary windings. The primary side of the signal transformer may be driven by the RF signal generator. Each wire in the pair of wire leads belonging to the same phase may connect to one side of the two secondary windings. The other sides of the secondary windings may connect to a rectifier and the RF detector.

As another example, the circuit may include a signal transformer including a primary side and a secondary side having at least a first secondary winding and a second secondary winding. The primary side of the signal transformer may be driven by the RF signal generator. The first secondary winding may be connected across the two wires in the pair of wire leads belonging to the same phase. The second secondary winding may be connected to the RF detector.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Prior to performing de-energized work on electrical equipment, safety regulations require that workers verify equipment is in an electrically safe state. Until proven otherwise, equipment should be treated as energized and necessary precautions should be observed. One of the steps in the process of verifying that equipment is in an electrically safe state involves a multi-stage test for the absence of voltage. Before and after testing, the functionality of the tester must also be verified on a known source. When using a portable tester, this is a time-consuming process and may involve exposure to electrical hazards.

Figure 1:
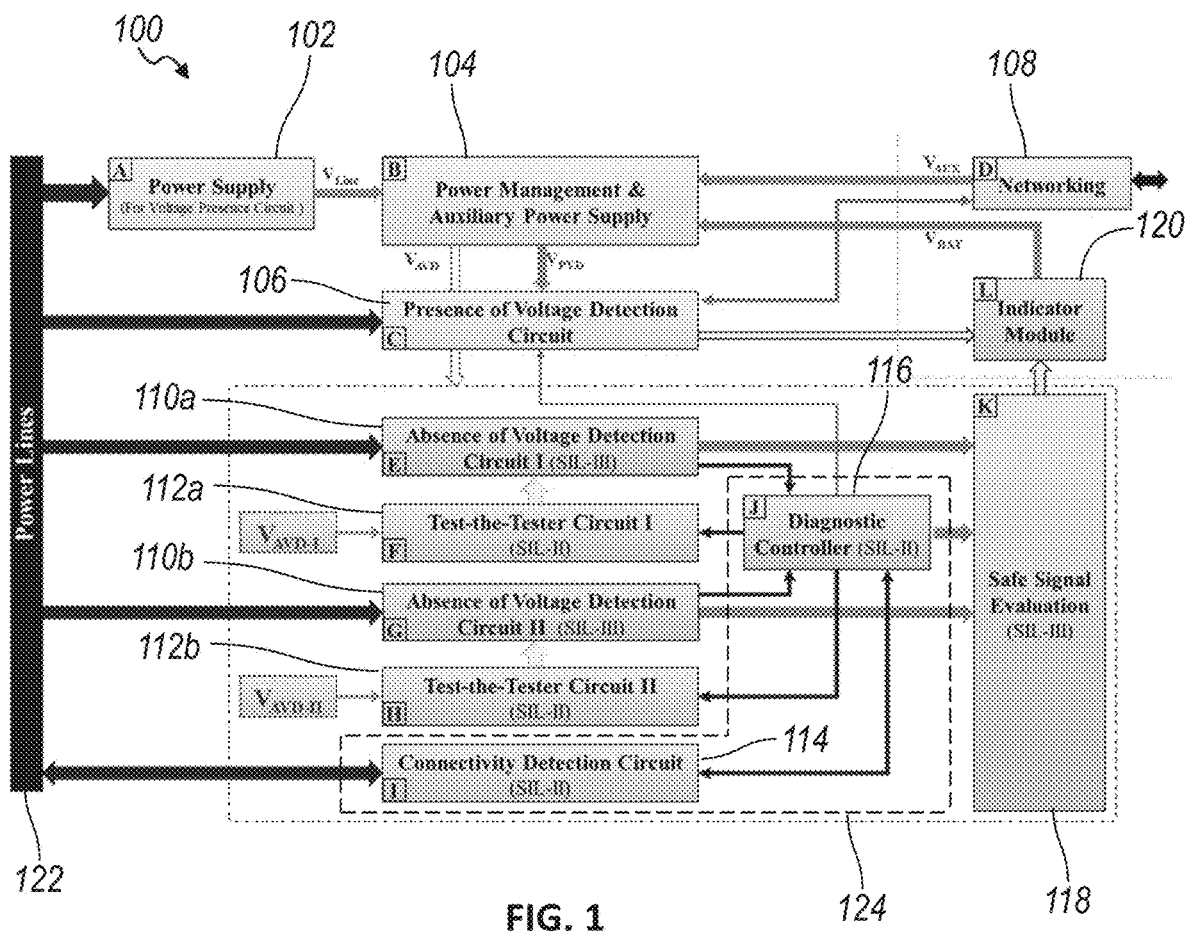
FIG. 1 is a high-level block diagram of an absence of voltage tester (AVT) system, according to one or more embodiments of the present disclosure.

FIG. 1 is a high-level block diagram depicting an absence of voltage tester (AVT) system 100 in accordance with one or more embodiments of the present disclosure. The AVT system may be permanently installed in industrial electrical equipment to automate the multi-stage voltage verification process. Moreover, the AVT system can verify the absence of voltage before electrically hazardous equipment is accessed, increasing safety in a fraction of the time required by hand-held portable test instruments. Thus, the AVT system may indicate whether the equipment is in an electrically safe state or not without directly accessing the equipment first.

The AVT system may include several circuits, power supplies, and modules. According to one or more embodiments, this may include a power supply 102, a power management and auxiliary power supply module 104, a presence of voltage detection circuit 106, a networking module 108, at least one absence of voltage detection circuit 110, at least one test-the-tester circuit 112, a connectivity detection circuit 114, a controller 116, a signal evaluation module 118, and an indicator module 120. As shown, the at least one absence of voltage detection circuit may include a first absence of voltage detection circuit 110*a* and a second absence of voltage detection circuit 110*b*. Likewise, the at least one test-the-tester circuit may include a first test-the-tester circuit 112*a* and a second test-the-tester circuit 112*b*.

Further, the AVT system may connect directly to main power lines 122 of the electrical equipment in which it is installed.

Reliable verification of absence of voltage requires reliable verification of the connectivity of cable leads of the AVT system to the main power lines in the electrical equipment being serviced. Connectivity verification (CV) is a step implemented into the AVT design to validate and confirm that an installed AVT system is directly coupled as intended with direct connection to the electrical equipment or device being monitored. Connectivity verification may thus ensure that the AVT is measuring the actual voltage on the power lines rather than registering a no-voltage condition due to an unknown disconnection error or installation failure (e.g., the cable leads for each phase are shorted together or left dangling).

In industrial electrical equipment, installation failure is typically a loose or severed connection due to a faulty termination, thermal expansion, or vibration. Verifying that connectivity between cable leads of the AVT system and the circuit conductors exists can be accomplished by verifying that there is continuity throughout the system from the AVT to the main power lines. Accordingly, the AVT system 100 may include a connectivity verification system 124. The connectivity verification system is a subsystem that may validate and ensure a proper connection to the main power lines of the electrical equipment in which the AVT system is installed. The connectivity verification system may verify proper connection to the main power lines in a three-phase system, a single-phase system, as well as in DC Power systems.

At a high level, as shown in FIG. 1, the connectivity verification system 124 may include at least the connectivity detection circuit 114 and the controller 116. Connectivity verification may be controlled by the controller, which may be a core AVT system microcontroller used for system diagnostics or a dedicated microcontroller for connectivity verification.

Figure 2:
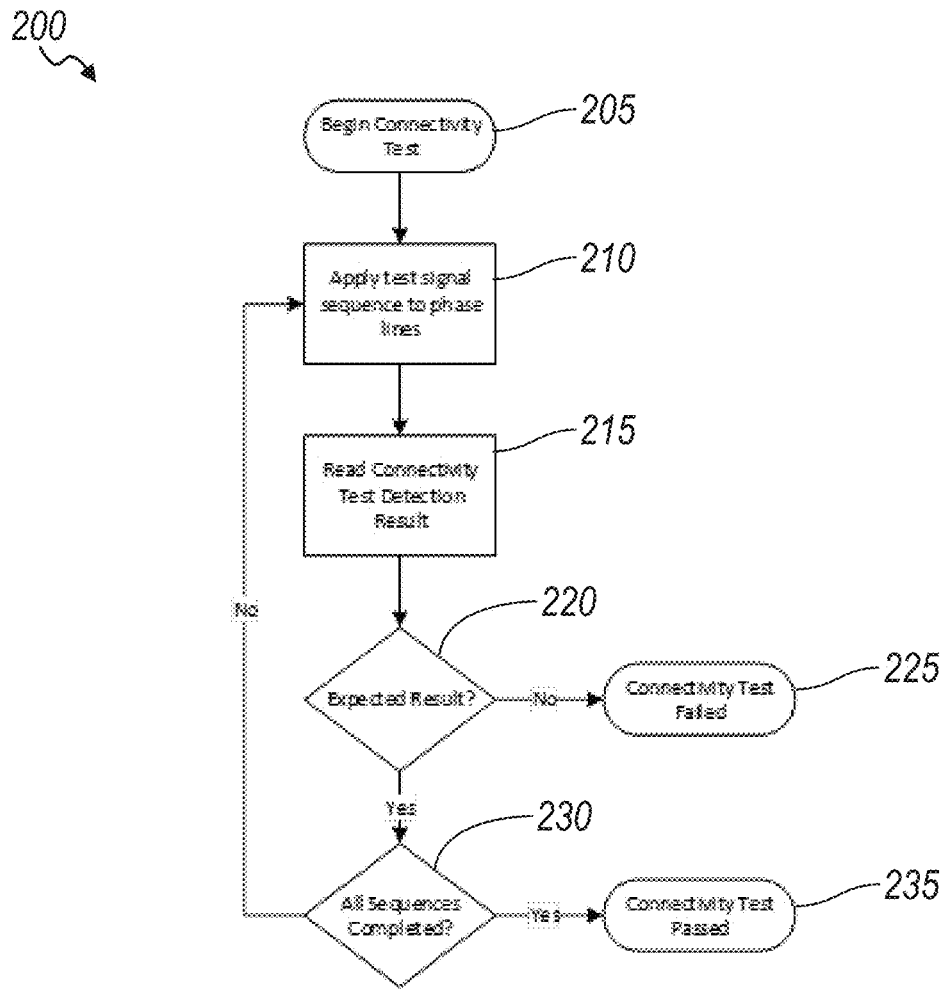
FIG. 2 is a high-level flow chart depicting a general method for verifying proper connectivity of an AVT system, according to one or more embodiments of the present disclosure.

FIG. 2 is a high-level flow chart depicting a general method 200 for verifying proper connectivity of the AVT system to the power lines of the electrical equipment being monitored. The connectivity verification procedure begins at step 205. A test may be initiated on each phase or wire by applying a test signal to each phase line in sequence, as provided at step 210. After each test signal is applied, the controller may read and analyze a result of the test signal, which may be indicative of a connectivity verification status, as provided at step 215. The controller may determine whether the connectivity verification result is expected at step 220. If the test result is not expected, the connectivity verification procedure may be deemed to have failed, as provided at step 225. If, on the other hand, the test result is as expected, the method 200 may proceed to step 230. At step 230, the controller may determine whether all test sequences in the connectivity verification procedure have been completed. If all test sequences have been successfully completed, the connectivity verification test passes and proper connectivity of the AVT system cable leads may be validated, as provided at step 235.

To increase confidence, the procedure may also employ a series of self-diagnostic sequences that are executed before and after each connectivity verification test to ensure that all the connectivity verification critical components, circuits, or processes are operational and performing as expected. The self-diagnostic sequences may further ensure that the AVT system doesn't have an internal hardware failure that can trigger a false outcome under any of the testing conditions. Additionally, this procedure may help confirm that the functionality of the system was not adversely impacted by any undesirable factors that could be present in the environment where the AVT has been installed (e.g., extreme temperatures, aging, noise, static discharge, or the like).

Therefore, part of connectivity verification may include confirming the functionality of the connectivity verification system, which can add confidence to the validity of the connectivity verification result. As shown generally in FIG. 2, the connectivity verification test passes if all connectivity verification test sequences provide the expected results. Otherwise, the connectivity verification test fails. In the event of a failure, software may determine which phase or phases are disconnected for error reporting purposes.

Various techniques for verifying the connectivity of system cable leads during presence and absence of voltage testing with a permanently installed voltage tester are described in greater detail below. The connectivity verification techniques described herein can be applied to single- or multi-phase AC power systems, as well as DC power systems in any system grounding topology (e.g., whether a negative, positive, or high impedance grounding system). Additionally, the described connectivity verification techniques are robust against capacitive and inductive loads. Thus, connectivity verification may not be affected by capacitor banks connected in parallel with the AVT.

First Connectivity Verification (CV) Technique

Figures 3, 4:
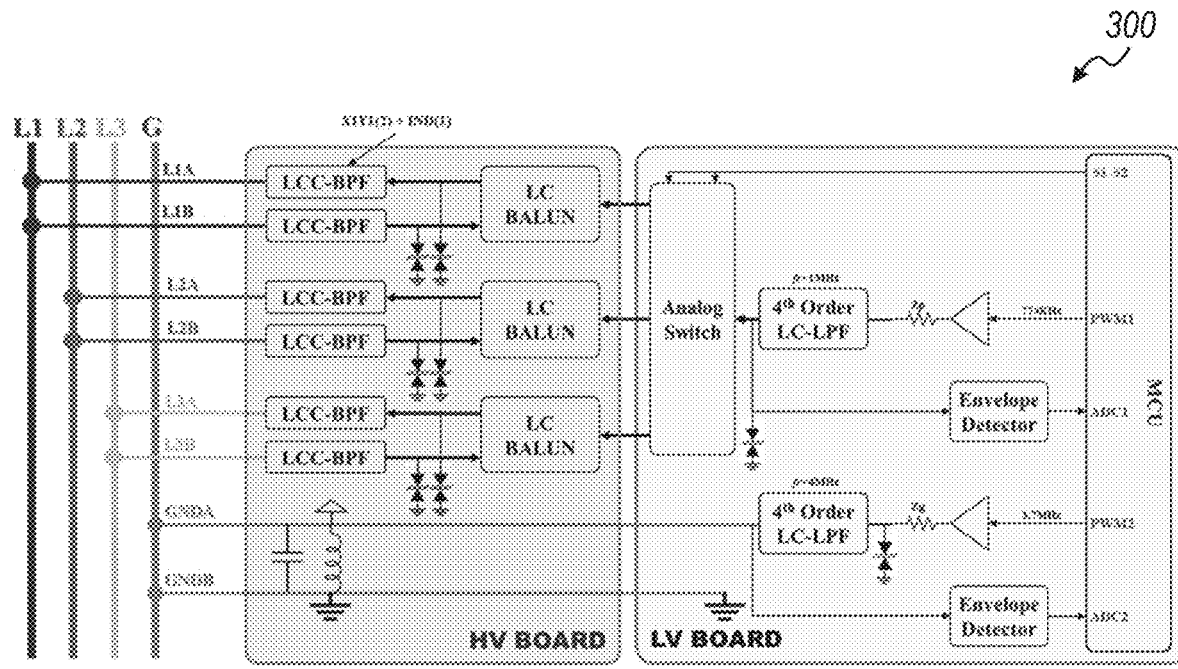
FIG. 3 is a block diagram depicting an architecture of a connectivity verification (CV) system, according to one or more embodiments of the present disclosure.
FIG. 4 is a sample truth table for a phase leads connectivity test sequence, according to one or more embodiments of the present disclosure.

FIG. 3 is a block diagram depicting the architecture of a connectivity verification (CV) system 300, in accordance with one or more embodiments of the present disclosure. The CV system may be constructed of a radio frequency (RF) signal modulation and generation circuit (often referred to as an RF signal generator) and an RF signal demodulation and detection circuit (often referred to as an RF detector). The CV system and corresponding circuitry may be designed to verify the continuity between two wires that belong to the same phase using multiple pairs of wire leads. The wires leads are physically separate on the CV circuit inputs and connect to the same terminal (i.e., phase) on the power lines side. Accordingly, for multi-phase electrical equipment, each phase may require two wire leads. Thus, as shown in FIG. 3, a three-phase system may require six wires in addition to two wires for safety ground. Various components of the CV system may be separated into low voltage and high voltage such that the high voltage components may reside on a high voltage board and the low voltage components may be placed on one or more low voltage boards.

The RF signals for both the RF modulation/generation circuit and demodulation/detection circuit may be driven by the controller. The CV system may implement two independent CV circuits: one dedicated for the three redundant phase lead-wires (in the case of a three-phase system as shown in FIG. 3) and the other dedicated for the Safety Ground redundant lead-wires. These two independent CV circuits within the CV system are generally referred to below a Phase Leads Connectivity Detector and a Ground Leads Connectivity Detector and are described in turn below in greater detail.

A. Phase Leads Connectivity Detector

The controller may include a high-resolution timer that may be used to modulate/generate a square wave signal at multiple frequencies. For example, the high-resolution timer may be used to generate multiple frequencies between 774 kHz and 830 kHz. The resultant square wave signal may be driven by an external buffer throughout a pre-defined line impedance Zp. The square wave signal may then be converted into a sinewave using a low-pass filter. According to an embodiment, the low-pass filter may be a 4th-order passive-type low-pass filter.

The generated sinewave RF signal may be fed to an analog switch. In a three-phase system, the analog switch may be a demultiplexer. For example, an ultra-low leakage current, 1:3 analog demultiplexer may be employed to sequence the RF signals generated at a predetermined frequency over the three phases wire pairs. The demultiplexer may be directly controlled by the controller. The distributed RF signal may then be converted from unbalanced (single-ended) to balanced (differential) via Lumped LC Balun dedicated for each phase. The outputs of the Balun may connect to the wire pairs of each phase through LC resonance filters. The LC resonance filters may be constructed from X1Y1 capacitors and high-frequency inductors in series, forming a resonance band-pass filter. As an example, the X1Y1 capacitors may be rated at 760 VAC/1500 VDC and form capacitive coupling with 8 KV reinforced isolation between primary (i.e., power lines) and secondary (i.e., CV) circuits.

The RF demodulation/detection circuit (e.g., RF detector) may include an RF envelop detector. The input of the envelope detector may connect to the output of the low-pass filter. The output of the RF envelop detector may connect to an ADC pin on the controller.

Figure 5:
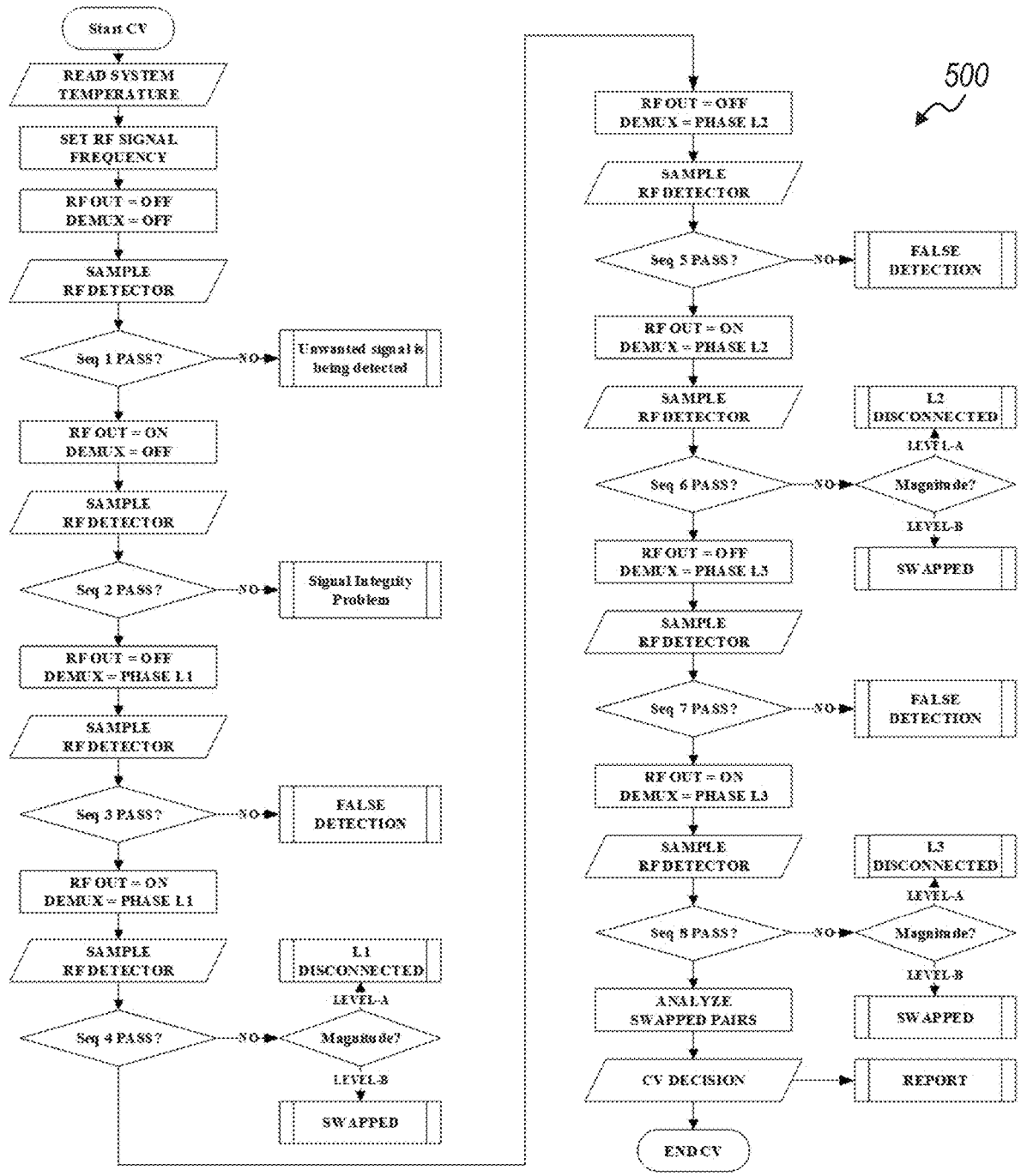
FIG. 5 is a sample flowchart depicting a method for verifying the connectivity of phase leads to three-phase electrical equipment, according to one or more embodiments of the present disclosure.

The CV system may employ a sequence of tests to verify connectivity of an absence of voltage tester to electrical equipment. FIG. 4 depicts a sample truth table 400 for the phase leads connectivity test sequence with examples of expected outcomes, in accordance with an embodiment of the present disclosure. The controller may control the CV test sequence. FIG. 5 is a sample flowchart of a method 500 for verifying the connectivity of the phase leads.

The phase leads CV test sequences are described in greater detail below, with reference to FIGS. 4 and 5. As shown and described, the first two test sequences may be self-diagnostic sequences. Sequence 1 is a first CV self-diagnostic sequence. In Sequence 1, both the analog demultiplexer and the RF signal generator are OFF. Accordingly, Sequence 1 can verify whether any unwanted signal at the output of the of the RF detector is being detected by the controller given that the demultiplexer as well as the RF signal generator are OFF. Moreover, any signal at the output of the RF detector during Sequence 1 may also be used as a reference signal to confirm a baseline of the RF detector circuit as well as the system noise floor.

Sequence 2 may be a second CV self-diagnostic sequence. As shown in FIGS. 4 and 5, the RF signal generator may be turned ON while the analog demultiplexer remains OFF. Sequence 2 can verify that the CV system is generating an RF signal and that the RF envelop detector can detect it.

Sequences 3, 5, and 7 may also form parts of the CV self-diagnostic. For each, the RF signal generator may be disconnected or otherwise OFF. Depending on the sequence, the analog demultiplexer connects the corresponding phase (L1, L2, or L3) to the RF detector using the S1-S2 outputs on the controller, which are connected to the IN1 and IN2 inputs of the demultiplexer. For example, Sequences 3, 5, and 7 may connect the RF detector to Phases L1, L2, and L3, respectively. With the RF signal generator disconnected, the controller may sample the RF detector output and characterize any noise on the power line of the corresponding phase (e.g., unwanted signals that have similar frequency components to the ones generated by the CV system/circuits) in order to identify any kind of false detections. Sequences 3, 5, and 7 may also provide a baseline of each phase in the CV circuit, which is dependent upon the characteristic impedance of the wire leads and the nature of the load connected to the power line mains.

Sequences 4, 6, and 8 are the CV test sequences that may verify whether the ends of each pair of wire leads belonging to the same phase are connected. These sequences may also verify if any of the two wires belonging to different phases are swapped. In each of Sequences 4, 6, and 8, the RF signal generator may be active. Depending on the sequence, the analog multiplexer connects the corresponding phase to the RF detector, as with Sequences 3, 5, and 7. The controller may sample the RF detector output and characterize the detected signal.

The CV principal depends mainly on detecting the change to the RF circuit characteristic impedance Zc. The nominal impedance when the demultiplexer is OFF and RF is ON may be characterized by Zc=Zp. When the demultiplexer is turned ON or otherwise connected to a power line phase, two scenarios may occur: either 1) the wire leads belonging to the same phase are not connected; or 2) the wire leads belonging to the same phase are connected.

In the first scenario, in which the wire leads belonging to the same phase are not connected, the impedance may be characterized by Zw. Zw represents the complex impedance of the lead wires, which is dependent upon the self-inductance of the wire leads, as well as the capacitive and inductive coupling between different wire leads. Zp may be approximately four (4) times Zw when using 10-foot wire leads. The relatively higher impedance will result in a relatively higher amplitude at the RF detector output.

In the second scenario, in which the wire leads belonging to the same phase are connected, the resultant impedance will generally be much lower as compared to the first scenario. Accordingly, the RF detector output level will be lower due to the low impedance.

The RF detector output may be sensed by the internal analog-to-digital converter (ADC) on the controller. The ADC may sample the detected signal amplitude and compare it to pre-defined reference thresholds. the CV circuit test sequence outcome will be TRUE only when the two wires belonging to the same phase are connected at a power line terminal. If any of the eight test sequences outcomes are FALSE, the AVT may terminate the testing procedure and an error may be reported.

B. Ground Leads Connectivity Detector

Referring back to FIG. 3, the high-resolution timer may be used by the controller to modulate/generate a square wave signal at multiple frequencies for the ground leads connectivity detection circuit. For example, the high-resolution timer may be used to generate multiple frequencies between 2.2 MHz and 2.7 MHz. The generated square wave signal may be driven by an external buffer throughout a pre-defined line impedance Zg. The square wave signal may then be converted into a sinewave using a low-pass filter. Similar to the phase leads connectivity detection circuit, the low-pass filter may be a 4'-order passive-type low-pass filter. The output of the low-pass filter may connect to the safety ground wire pair. An LC resonance band-stop filter having, for example, a 2.5 MHz self-resonance frequency may be used to galvanically connect the two ground leads together. The LC resonance band-stop filter may include a high-current power inductor and an RF capacitor in parallel.

Figure 6:
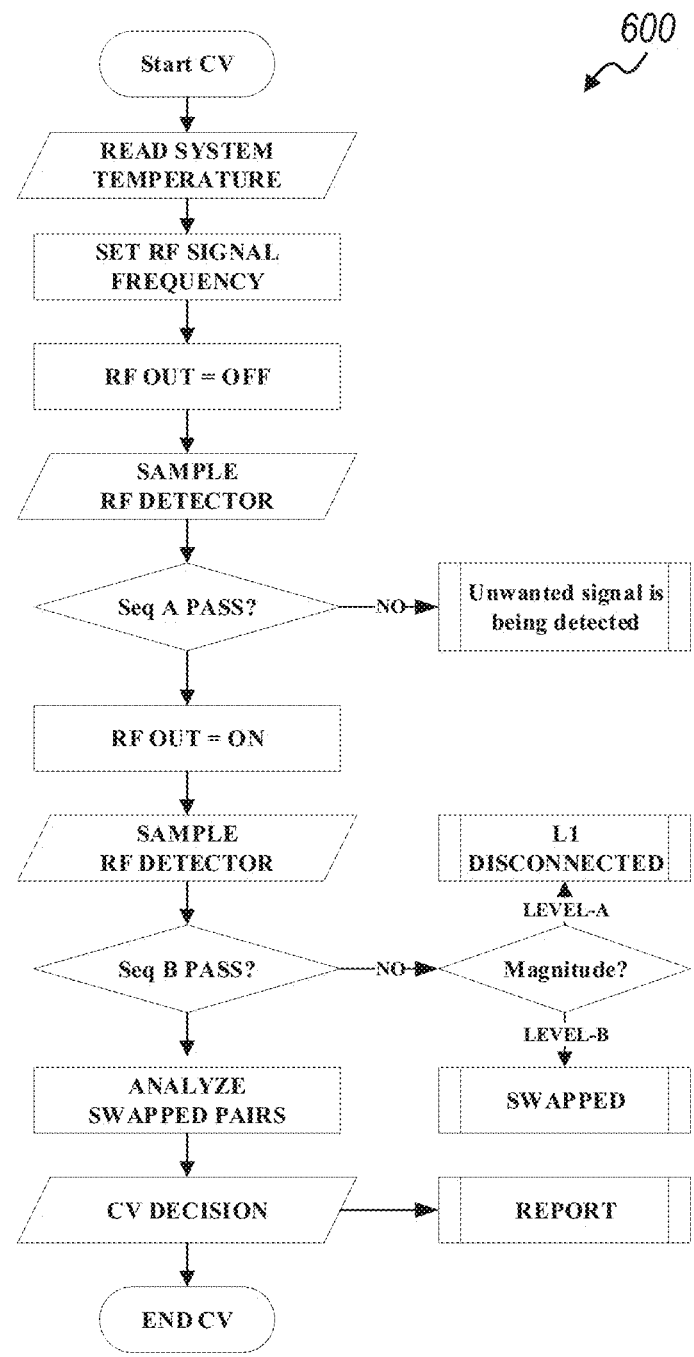
FIG. 6 is a sample flowchart depicting a method for verifying the connectivity of the ground leads to electrical equipment, according to one or more embodiments of the present disclosure.

The CV system may employ a ground leads CV test sequence to verify connectivity of an absence of voltage tester to the ground leads in electrical equipment. The ground leads CV test sequence may also be controlled by the controller. FIG. 6 is a sample flowchart of a method 600 for verifying the connectivity of the ground leads. With reference to FIG. 6, the ground leads CV test sequences may include at least a Sequence A and a Sequence B.

Sequence A may be a self-diagnostic sequence. In Sequence A, the RF signal generator may be OFF. Accordingly, Sequence A can verify whether any unwanted signal is being detected by the controller given that the RF generator is OFF. Moreover, any signal at the output of the RF detector during Sequence A may be used as a reference signal to confirm the baseline of the RF detector circuit as well as the system ground noise floor. Sequence A may also detect if the ground leads are being swapped with any of the phase leads.

Sequence B may be the test sequence that verifies if the ground wire leads ends are connected. The RF signal generator will be active. The controller may sample the RF detector output and characterize the detected signal. Sequence B may also verify if any of the two wires belonging to ground are swapped with a phase wire. When the two ground wire lead ends are connected, the LC resonant filter will be shorted, resulting in attenuating the RF signal. When the ends are loose or disconnected, the LC resonant filter will act as an RF switch and the signal will be detected by the RF detector. The attenuation of the RF signal may depend on the tuning frequency of the LC resonator and the frequency of the RF signal generated by the controller.

Second Connectivity Verification (CV) Technique

A. Phase Leads Connectivity Detector

Figure 7:
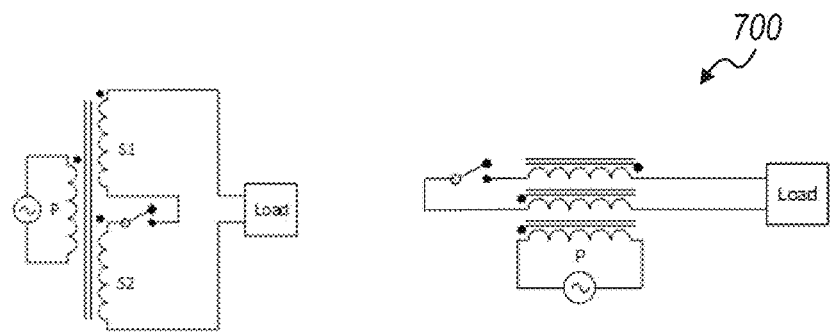
FIG. 7 illustrates a transformer arrangement for an alternate phase leads connectivity detector, according to one or more embodiments of the present disclosure.
Figure 8:
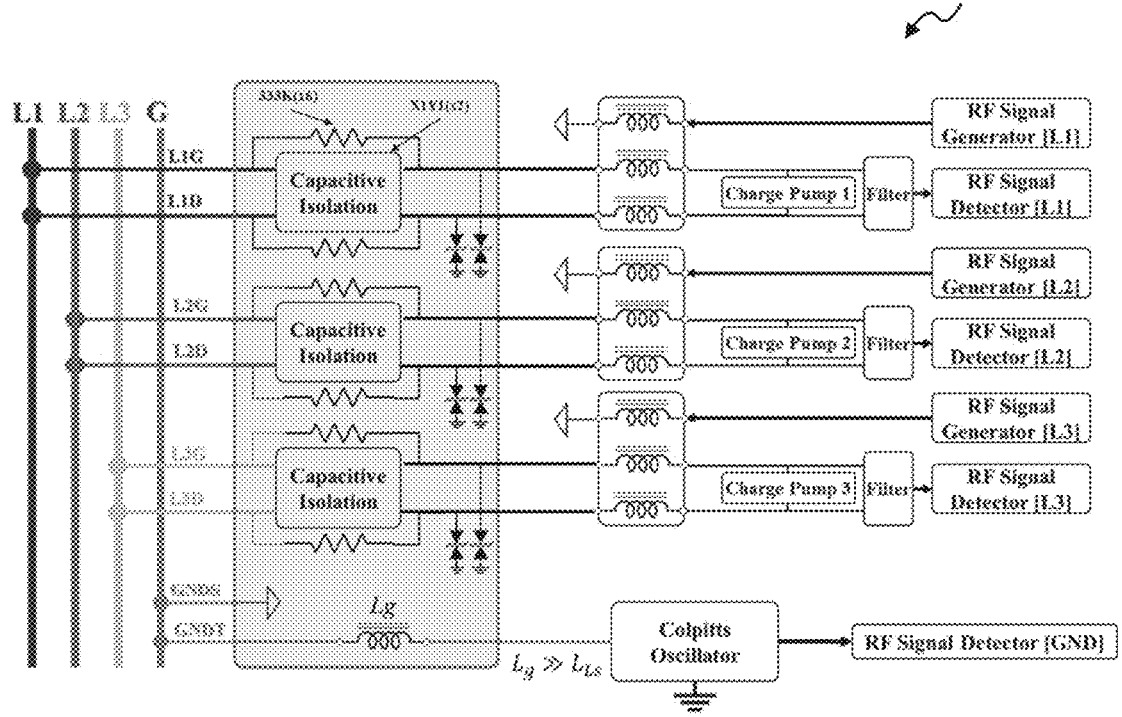
FIG. 8 is a block diagram depicting an alternative architecture of a connectivity verification (CV) system employing the transformer arrangement illustrated in FIG. 7, according to one or more embodiments of the present disclosure.

FIGS. 7 and 8 illustrate a second connectivity verification (CV) concept, according to one or more embodiments of the present disclosure. FIG. 7 illustrates two different schematic representations of a transformer arrangement 700 for the second connectivity verification concept. FIG. 8 is a block diagram depicting the architecture of a second connectivity verification (CV) system 800 employing this concept. As shown, the second connectivity verification concept may employ a high-frequency signal transformer, an RF signal generation circuit, and an RF signal detection circuit. In an example embodiment, the transformer may include a 1:1:1 turn ratio. The RF signal generation circuit may include at least the RF signal generator, while the RF signal detection circuit may include at least the RF detector. As set forth above, the RF detector may be an envelope detector. Again, the RF signals for both the generation and detection circuits may be driven by the controller (not shown).

The RF signal generation circuit may drive a primary side (P) of the transformer, for example, at 1 MHz resonance frequency. Each of the two wires belonging to the same phase may connect to one side of the two windings on the secondary side (S) of the transformer, which may be 180° out of phase. The other sides of the transformer secondary windings may connect to a rectifier and the RF detector. The rectified signal may be applied across a load and then sampled by the ADC of the controller.

As previously described, FIG. 7 illustrates two different schematic representations of a transformer arrangement 700 employed by the second connectivity verification system. The switch shown in the schematic diagrams in FIG. 7 represents whether the wire leads belonging to the same phase are connected at a power line. As before, there may be two scenarios for the outcome: 1) the wire leads belonging to the same phase are connected; and 2) the wire leads belonging to the same phase are not connected.

In the first scenario, in which the wire leads belonging to the same phase are connected, the transformer secondary side windings will be in series. As such, the transformer may act as a current source. Consequently, the ADC of the controller may sense a larger amplitude when connected wire leads belonging to the same phase are connected. This is because the amplitude at the output of the RF signal detector depends on the self-inductance of the cable, as well as the nature of the load (i.e., capacitive, inductive, or resistive) connected to the power lines. The amplitude would be maximum in the case of a resistive load.

In the second scenario, in which the wire leads belonging to the same phase are not connected, the transformer secondary windings may be disconnected, and the transferred energy may be at minimum. The self-capacitance of the lead wires can still cause some energy to be transferred to the load. A decision threshold against which the RF detector output can be compared may be defined to account for a worst-case scenario, which may be the characterized coupling capacitance for a maximum length of the lead wires.

In DC power distribution systems, capacitor banks with a high capacitive load that might be present on the DC bus can sink the current induced in the transformer secondary windings. A small DC voltage can be built up on the load by adding a charge pump with a leakage path, as shown in FIG. 8. The built-up DC voltage may be sampled over a period and compared to a pre-defined threshold to verify connectivity.

As shown in FIG. 8, a capacitive isolation may be formed, for example, by X1Y1 capacitors rated for functional safety application. The DC path may be established using, for example, a 2 Mohm impedance across the capacitive isolation.

B. Ground Leads Connectivity Detector

Figure 9:
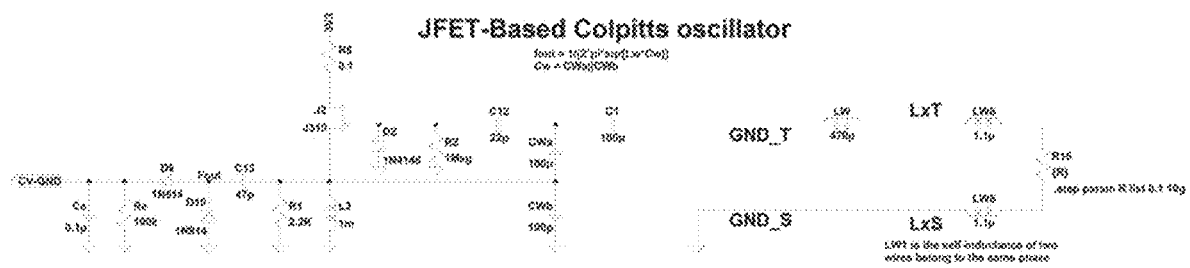
FIG. 9 is a schematic diagram of a Colpitts oscillator shown in FIG. 8, according to one or more embodiments of the present disclosure.

The ground leads connectivity scheme may implement a Colpitts oscillator, as shown in FIG. 8. FIG. 9 depicts the Colpitts oscillator in greater detail, in accordance with one or more embodiments. The Colpitts oscillator may be a JFET-based, high-gain Colpitts oscillator. For example, the Colpitts oscillator may be a 1.25 MHz modified JFET-Based, high-gain Colpitts oscillator. The oscillation frequency may be determined by the LC tank circuit in the oscillator feedback that drives the JFET base. The tank circuit inductor, Lg, may be connected in series with one of the ground leads wires of the CV system that is not used as a system ground.

If the ground leads are disconnected at the ends, the tank circuit inductor Lg will be disconnected from tank circuit keeping the oscillator's feedback loop open. When the ground leads are connected, the inductor Lg will be in the feedback loop causing the oscillator to resonate. As shown in FIG. 8, the output of the oscillator may be connected to and RF detector, such as an envelope detector. The RF detector output may be sensed by an ADC channel on the controller. Again, the RF detector output level may indicate whether the pair of ground lead wires are properly connected to the electrical equipment ground.

The value of Lg may be selected such that the resonance tank inductance is a predetermined amount more than the maximum self-inductance of the lead wires. The predetermined amount may be selected to ensure that changing the length of the lead wires will not cause a significant change to the oscillation frequency of the Colpitts oscillator. As an example, the value of Lg may be selected such that the resonance tank inductance is approximately 100 times more than the maximum self-inductance of the lead wires.

Third Connectivity Verification (CV) Technique

Figure 10:
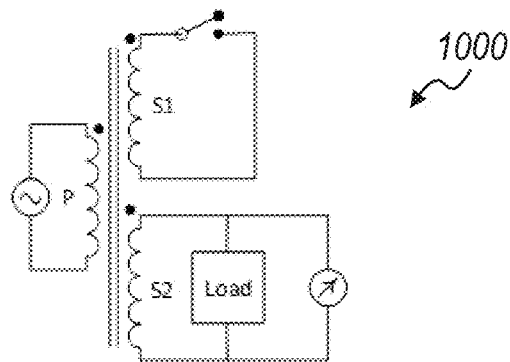
FIG. 10 illustrates an alternative transformer arrangement for another phase leads connectivity detector, according to one or more embodiments of the present disclosure.
Figure 11:
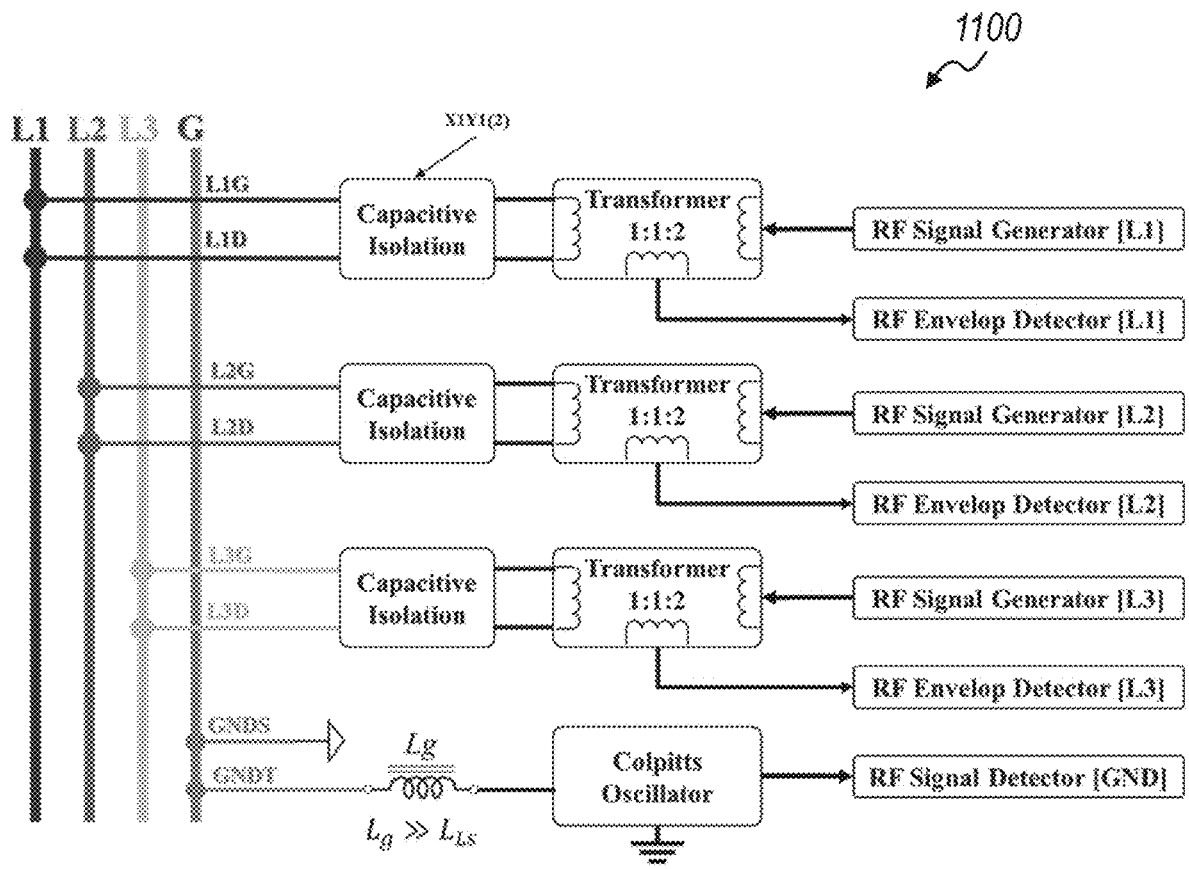
FIG. 11 is a block diagram depicting another alternative architecture of a connectivity verification (CV) system employing the transformer arrangement illustrated in FIG. 10, according to one or more embodiments of the present disclosure.

FIGS. 10 and 11 illustrate a third connectivity verification (CV) concept, according to one or more embodiments of the present disclosure. FIG. 10 illustrates a schematic representation of a transformer arrangement 1000 for the third connectivity verification concept. FIG. 11 is a block diagram depicting the architecture of a third connectivity verification (CV) system 1100 employing this concept. As shown, the third connectivity verification concept may again employ a three winding, high-frequency signal transformer, an RF signal generator, and an RF detector for verifying the connectivity of the phase leads. In an example embodiment, the transformer may include a 1:1:2 turn ratio. The RF signal generator and RF detector circuits may again be driven by the controller (not shown).

The RF signal generator may drive a primary side (P) of the transformer, for example, at around 2 MHz resonance frequency. A first secondary winding (S1) may be connected across the two wires leads belonging to the same phase throughout a capacitive coupling barrier. The capacitive coupling barrier (capacitive isolation) may be composed of two X1Y1 safety rated capacitors on each wire lead, as depicted in FIG. 11. A second secondary winding (S2) may be connected to an RF detector, which may be an envelope detector. The second secondary winding (S2) may have a ratio of two (2). The rectified signal that is applied across the load may then be sampled by an ADC channel of the controller.

The switch shown in the schematic diagrams in FIG. 10 represents whether the wire leads belonging to the same phase are connected at a power line. As before, there may be two scenarios for the outcome: 1) the wire leads belonging to the same phase are not connected; and 2) the wire leads belonging to the same phase are connected.

In the first scenario, in which the wire leads belonging to the same phase are not connected, the energy may be transferred from the transformer's primary side (P) to the secondary side windings with a ratio of two (times 2). In this scenario, the ADC channel of the controller may sense a larger amplitude output from the corresponding RF detector.

In the second scenario, in which the wire leads belonging to the same phase are connected, the first secondary windings (S1) of the transformer may be shorted causing a disturbance in the flux lines across the transformer core. As a result, the transferred energy from the primary side to the secondary side may be reduced. Accordingly, the controller ADC may sense less amplitude at the corresponding RF detector output compared to the case when the wire leads belonging to the same phase are disconnected.

As shown in FIG. 11, the third connectivity verification concept may employ the same or similar ground leads connectivity scheme as the second connectivity verification concept discussed above.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method for verifying connectivity of an absence of voltage tester to power lines in electrical equipment, the method comprising:
   generating an unbalanced radio frequency (RF) signal at a predetermined frequency using an RF signal generator;
   converting the unbalanced RF signal to a balanced differential RF signal
   transmitting the differential RF signal across a circuit including a pair of wire leads, each wire in the pair of wire leads being connected to a power line having a same phase;
   receiving the RF signal at an RF detector; and
   determining whether each wire in the pair of wire leads is connected to a same power line via a change in a characteristic impedance of the circuit.

2. The method of claim 1, wherein the change in the characteristic impedance of the circuit is determined by a change in amplitude of the output of the RF detector signal.

3. The method of claim 2, wherein determining whether each wire in the pair of wire leads is connected to the same power line based on an amplitude of the output comprises:
   comparing the amplitude to a threshold; and
   verifying that each wire in the pair of wire leads is connected to the same power line when the amplitude is below the threshold.

4. The method of claim 2, wherein determining whether each wire in the pair of wire leads is connected to the same power line based on an amplitude of the output comprises:
   comparing the amplitude to a threshold; and
   verifying that each wire in the pair of wire leads is connected to the same power line when the amplitude exceeds the threshold.

5. The method of claim 1, further comprising:
   prior to transmitting the balanced differential RF signal across the circuit, connecting the RF signal generator to the circuit using an analog switch.

6. The method of claim 5, further comprising:
   prior to connecting the RF signal generator to the circuit, analyzing the output of the RF detector with the RF signal generator off.

7. The method of claim 5, further comprising:
   prior to connecting the RF signal generator to the circuit, analyzing the output of the RF detector with the RF signal generator on.

8. A connectivity verification system comprising:
   a radio frequency (RF) signal generator configured to generate an RF signal;
   an RF detector in communication with the RF signal generator; and
   a circuit, having a characteristic impedance, coupled to the RF signal generator via another circuit configured to convert the unbalanced RF signal to a balanced differential RF signal and RF detector, the circuit including a pair of wire leads, each wire in the pair of wire leads being connected to a same phase wire of a power line;
   wherein connectivity of the pair of wire leads to the same phase wire of the power line is verified by analyzing a change in the characteristic impedance.

9. The connectivity verification system of claim 8, wherein the circuit includes at least one LC Balun configured to convert the RF signal from single-ended to differential, wherein each output of the LC Balun is connected to one wire in the pair of wire leads through an LC resonance filter.

10. The connectivity verification system of claim 8, wherein the circuit includes a signal transformer including a primary side and a secondary side having at least two secondary windings, the primary side of the signal transformer being driven by the RF signal generator, each wire in the pair of wire leads belonging to the same phase connects to one side of the two secondary windings, wherein other sides of the secondary windings connect to a rectifier and the RF detector.

11. The connectivity verification system of claim 8, wherein the circuit includes a signal transformer including a primary side and a secondary side having at least a first secondary winding and a second secondary winding, the primary side of the signal transformer being driven by the RF signal generator, the first secondary winding being connected across the two wires in the pair of wire leads belonging to the same phase, the second secondary winding being connected to the RF detector.

* * * * *